(12) United States Patent
Diamond

(10) Patent No.: US 6,269,368 B1
(45) Date of Patent: Jul. 31, 2001

(54) INFORMATION RETRIEVAL USING DYNAMIC EVIDENCE COMBINATION

(75) Inventor: Theodore G. Diamond, Syracuse, NY (US)

(73) Assignee: Textwise LLC, Syracuse, NY (US)

( * ) Notice: Subject to any disclaimer, the term of this patent is extended or adjusted under 35 U.S.C. 154(b) by 0 days.

(21) Appl. No.: 09/173,968

(22) Filed: Oct. 16, 1998

Related U.S. Application Data

(60) Provisional application No. 60/063,752, filed on Oct. 17, 1997.

(51) Int. Cl.[7] .................................................. G06F 17/00
(52) U.S. Cl. .................................................. 707/6; 3/4; 3/5
(58) Field of Search ........................ 707/3–10, 100–104, 707/200–206, 513–532; 345/302

(56) References Cited

U.S. PATENT DOCUMENTS

| | | | |
|---|---|---|---|
| 5,619,709 | * | 4/1997 | Caid et al. ............................ 707/532 |
| 5,794,178 | * | 8/1998 | Caid et al. ............................ 707/531 |
| 5,819,264 | * | 10/1998 | Palmon et al. ........................ 707/102 |
| 5,915,259 | * | 6/1999 | Murata .................................. 707/513 |
| 5,970,490 | * | 10/1999 | Morgenstern ......................... 707/104 |

OTHER PUBLICATIONS

Heuer et al. "BlueView: virtual document servers for digital libraries", Advances in Digital Libraries, 2000, Proceedings, IEEE, pp. 207–217, May 2000.*

Heuer et al., "Integrating a query language for structured and semi–structured data and IR techniques", Database and Expert Systems Applications, 2000, Proceedings, 11th International Workshop on, pp. 703–707, Sep. 2000.*

Shapiro et al., "Managing databases with binary large objects", Mass Storage Systems, 1999, 16th IEEE Symposium on, pp. 185–193, Mar. 1999.*

* cited by examiner

Primary Examiner—Thomas Black
Assistant Examiner—David Jung
(74) Attorney, Agent, or Firm—Townsend and Townsend and Crew LLP

(57) ABSTRACT

A system and method for improving information retrieval effectiveness by dynamically combining evidence information produced by a plurality of retrieval systems matching alternative representations of queries and documents. The user enters a query and the system generates alternative representations of the query. The system also maintains a collection of documents and corresponding alternative representations of the documents. The system then performs matching between the alternative representations of the query and the corresponding alternative representations of the documents and generates individual matching scores for the alternative representation matches. Correlation information is also determined for the individual scores. The individual matching scores are combined using a dynamic combination regime which is adjusted for the query. The dynamic combination regime may be a function of query specific information, retrieved documents specific information, or correlation information. The documents are ranked based on the combined scores. The user may also mark specific documents as being relevant. This relevance feedback information may also be used to modify the dynamic combination regime.

30 Claims, 6 Drawing Sheets

INFORMATION RETRIEVAL USING DYNAMIC EVIDENCE COMBINATION

CROSS-REFERENCES TO RELATED APPLICATIONS

This application claims priority from U.S. Provisional Patent Application Ser. No. 60/063,752, entitled INFORMATION RETRIEVAL USING DYNAMIC EVIDENCE COMBINATION, filed Oct. 17, 1997, the disclosure of which, including all referenced documents, is hereby incorporated by reference for all purposes.

BACKGROUND OF THE INVENTION

The present invention relates generally to the field of computer-based information retrieval, and more specifically to a system and method for improving information retrieval effectiveness by dynamically combining evidence information produced by a plurality of retrieval systems matching alternative representations of queries and documents.

Computer-based information retrieval is now an established industry serving many professional communities. Retrieval technologies used in this industry share many common features. For example, a user of these systems is typically required to either (1) state an information need, or query, in a circumscribed manner, usually by denoting the logical requirements of the query as a sequence of terms linked by various operators, or (2) write the query as free-form text, which is then parsed automatically into a sequence of words or phrases, without regard for the logical form of the query or the underlying meaning of the query. In either event the query is represented only by the collection of words that are overtly stated in the query text (or limited stemmed forms of some words, such as plurals). The matching of documents to a query is based on the co-occurrence of these words or phrases.

A second commonality among retrieval systems is that a query representation derived from a user's query statement is automatically formed by the computer system, with limited or no interaction with the user. In most retrieval systems, once an initial query statement has been made in full, the computer system interprets the contents of the query without allowing the user to verify, clarify or expand upon query representations created by the computerized retrieval system. In the same fashion, the subsequent display of retrieved documents is largely under computer control, with little user interaction.

Further several techniques have been developed for retrieving desired items from a collection of several items to satisfy a user's information needs as expressed through the query. However, most of these retrieval techniques fail to provide a comprehensive solution to the information retrieval problem. Although each retrieval technique provides its own independent evidence to rate collection of retrieved items for their relevance to the user's query, no one approach has been successful in providing all the evidence. A common solution to overcome limitations of individual search techniques has been to combine the results of a plurality of search techniques into a single set of results. This is usually done using static or fixed combination functions such as adding the results of the different retrieval techniques. Although this may provide improvements over individual search techniques, it does not take into consideration that different queries may be best served using different combination rules.

In view of the above, there is a need for an information retrieval technique which increases the effectiveness and preciseness of information retrieval while combining the results of multiple retrieval approaches. Further, it is desirable that the information retrieval technique capture both the preciseness and richness of meaning in queries and documents and allow for user feedback to facilitate the retrieval process.

SUMMARY OF THE INVENTION

The present invention provides a system and method for improving information retrieval effectiveness by dynamically combining evidence information produced by a plurality of retrieval systems matching alternative representations of queries and documents.

In one aspect, the present invention, in contrast to conventional systems that combine multiple evidence sources in a fixed or static manner, performs dynamic evidence combination wherein the combination regime, used to combine individual match scores based on multiple evidence sources, is dynamically adjusted for different queries and document collections. In one embodiment, the dynamic modification of the combination regime is based on information such as query dependent information, retrieved documents specific information, score correlation information for documents retrieved using multiple retrieval approaches, and optionally user relevance judgment information.

According to another aspect of the present invention, the amount of correlation among the scores returned by the different matchers is determined. If two or more matchers provide strongly correlated sets of scores for the documents, these scores may in some sense be redundant, and hence may be weighted downwardly. Correlation information is helpful for predicting the optimal score combination regime for a given query.

According to still another aspect of the present invention, techniques are provided for generating sophisticated representations of the contents of both queries and documents by using natural language processing (NLP) techniques to represent, index, and retrieve texts at the multiple levels (e.g., the morphological, lexical, syntactic, semantic, discourse, and pragmatic levels) at which humans construe meaning in writing. The invention also offers the user the ability to interact with the system to confirm and refine the system's interpretation of the query content, both at an initial query processing step and after query matching has occurred.

According to a further aspect of the invention, the user enters a query, possibly a natural language query, and the system processes the query to generate alternative representations of the query. The alternative representations may include conceptual-level abstraction and enrichment of the query, and may include other representations. In a specific embodiment, the conceptual-level representation is a subject field code vector, while the other representations include one or more of representations based on complex nominals (CNs), proper nouns (PNs), single terms, text structure, and logical make-up of the query, including mandatory terms and negations. After processing the query, the system displays query information to the user, indicating the system's interpretation and representation of the content of the query. The user is then given an opportunity to provide input, in response to which the system modifies the alternative representation of the query. Once the user has provided desired input, the possibly modified representation of the query is matched to the relevant document database, and measures of relevance generated for the documents. The documents in the database have preferably been processed to provide corresponding alternative representations for matching to queries.

According to another aspect of the invention, a set of retrieved documents is presented to the user, who is given an opportunity to select some or all of the documents, typically on the basis of such documents being of particular relevance. The user then initiates the generation of a query representation based on the alternative representations of the selected document(s). To the extent that the set of documents were retrieved in response to a previous query, the alternative representations of the selected documents may be combined with the alternative representation of the previous query. Thus the user is able to improve on an initial query representation by re-expressing the query as a composite of the representations derived from documents deemed highly relevant by the user, possibly combined with the representation of the original query. The selected documents information may also be used to dynamically modify the evidence combination regime so as to improve the number of relevant documents retrieved upon a subsequent execution of the query.

According to a further aspect of the invention, texts (documents and queries) are processed to determine discourse aspects of the text beyond the subject matter of the text. This text structure includes temporal information (past, present, and future), and intention information (e.g., analysis, prediction, cause/effect). Thus the invention is able to detect the higher order abstractions that exist in human communications that are above the word level, such as the difference between a statement describing an expected outcome, the consequence of a particular event (prediction), or a statement that described a past event. Since the system is able to recognize the manifold intentions in a query, it can operate on a greater scope of documents and data without the user having to pre-specify where one suspects the answers (documents) might be.

Further understanding of the nature and advantages of the invention may be realized by reference to the remaining portions of the specification and drawings.

DESCRIPTION OF THE SPECIFIC EMBODIMENTS 1.0 Introduction

This application describes a computer system used for information retrieval that, through a sequence of computer and user interactions, allows the expression and clarification of complex query statements and the retrieval and display of relevant documents using natural language processing (NLP) techniques. In particular, the present application describes a system and method for improving the information retrieval effectiveness by combining evidence information produced by a plurality of retrieval systems matching alternative representations of queries and documents.

Unless otherwise stated, the term "document" should be taken to mean a unit of text, which is selected for analysis, and to include an entire document, or any portion thereof, such as a title, an abstract, or one or more clauses, sentences, or paragraphs. A document will typically be a member of a document database, referred to as a corpus, containing a large number of documents. Such a corpus can contain documents in any or all of the plurality of supported languages.

Unless otherwise stated, the term "query" should be taken to mean text that is input for the purpose of selecting a subset of documents from a document database. While most queries entered by a user tend to be short compared to most documents stored in the database, this should not be assumed. The present invention is designed to allow natural language queries.

Unless otherwise stated, the term "word" should be taken to include single words, compound words, phrases, and other multi-word constructs. Furthermore, the terms "word" and "term" arc often used interchangeably. Terms and words include, for example, nouns, proper nouns, complex nominals, noun phrases, verbs, adverbs, numeric expressions, and adjectives. This includes stemmed and non-stemmed forms.

1.1 System Hardware Overview

Figure 1:
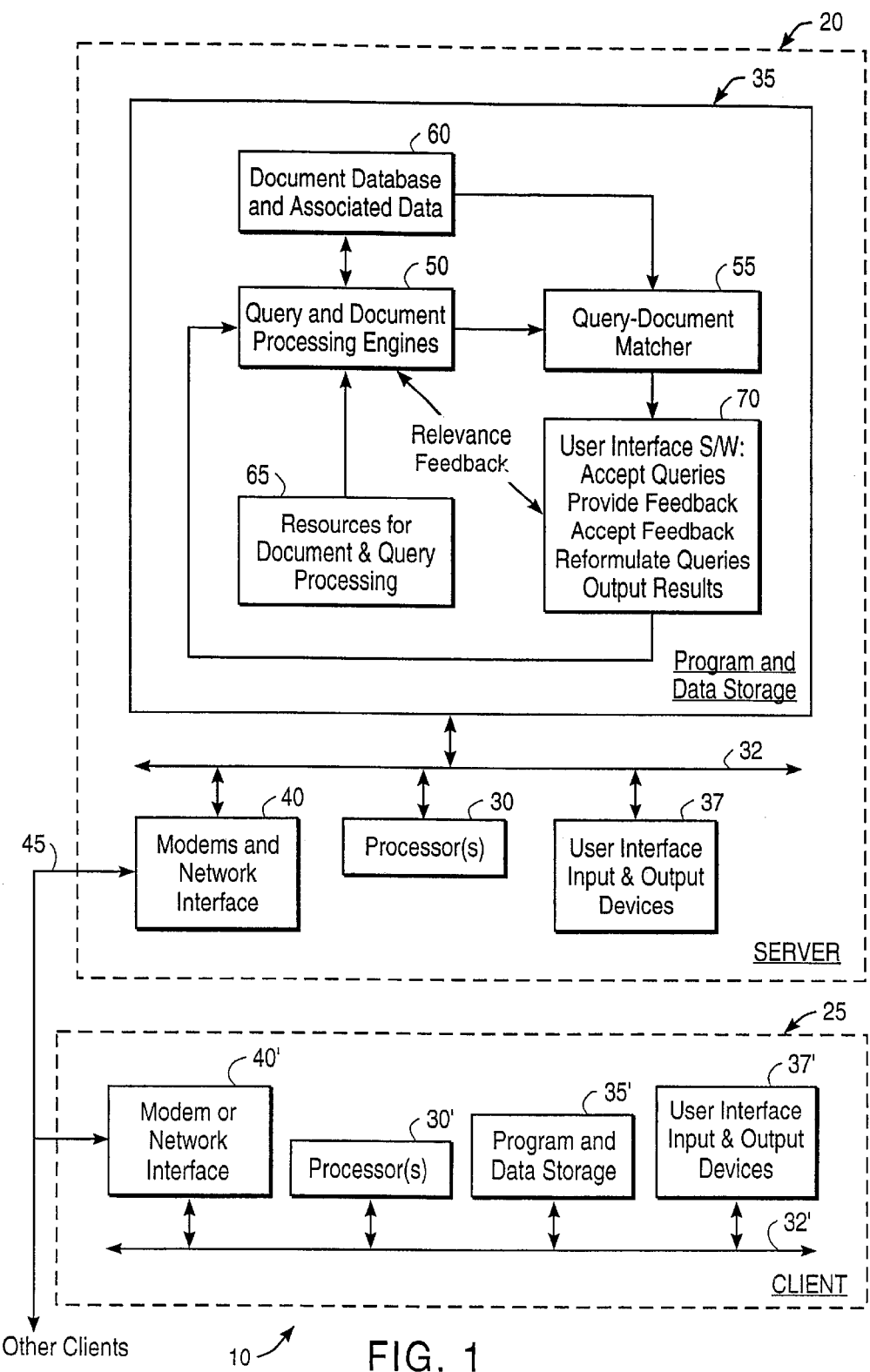
FIG. 1 is a block diagram of an information retrieval system embodying the present invention.

FIG. 1 is a simplified block diagram of a computer system 10 embodying the text retrieval system of the present invention. The invention is typically implemented in a client-server configuration including a server 20 and numerous clients, one of which is shown at 25. The use of the term "server" is used in the context of the invention, where the server receives queries from (typically remote) clients, does substantially all the processing necessary to formulate responses to the queries, and provides these responses to the clients. However, server 20 may itself act in the capacity of a client when it accesses remote databases located on a database server. Furthermore, while a client-server configuration is known, the invention may be implemented as a standalone facility, in which case client 25 would be absent from the figure.

The hardware configurations are in general standard, and will be described only briefly. In accordance with known practice, server 20 includes one or more processors 30 that communicate with a number of peripheral devices via a bus subsystem 32. These peripheral devices typically include a storage subsystem 35 (memory subsystem and file storage subsystem), a set of user interface input and output devices 37, and an interface to outside networks, including the public switched telephone network and the Internet. This interface is shown schematically as a "Modems and Network Interface" block 40, and is coupled to corresponding interface devices in client computers via a network connection 45.

Client 25 has the same general configuration, although typically with less storage and processing capability. Thus, while the client computer could be a terminal or a low-end personal computer, the server computer would generally need to be a high-end workstation or mainframe. Corresponding elements and subsystems in the client computer are shown with corresponding, but primed, reference numerals.

User interface input devices typically include a keyboard and may further include a pointing device and a scanner. The pointing device may be an indirect pointing device such as a mouse, trackball, touchpad, or graphics tablet, or a direct pointing device such as a touchscreen incorporated into the display. Other types of user interface input devices, such as voice recognition systems, are also possible.

User interface output devices may include a printer and a display subsystem, which includes a display controller and a display device coupled to the controller. The display device may be a cathode ray tube (CRT), a flat-panel device such as a liquid crystal display (LCD), or a projection device. Display controller provides control signals to the display device and normally includes a display memory for storing the pixels that appear on the display device. The display subsystem may also provide non-visual display such as audio output.

The memory subsystem typically includes a number of memories including a main random access memory (RAM) for storage of instructions and data during program execution and a read only memory (ROM) in which fixed instructions are stored. In the case of Macintosh-compatible personal computers the ROM would include portions of the operating system; in the case of IBM-compatible personal computers, this would include the BIOS (basic input/output system).

The file storage subsystem provides persistent (non-volatile) storage for program and data files, and typically includes at least one hard disk drive and at least one floppy disk drive (with associated removable media). There may also be other devices such as a CD-ROM drive and optical drives (all with their associate removable media). Additionally, the system may include drives of the type with removable media cartridges. The removable media cartridges may, for example be hard disk cartridges, such as those marketed by Syquest and others, and flexible disk cartridges, such as those marketed by Iomega. One or more of the drives may be located at a remote location, such as in a server on a local area network or at a site on the Internet's World Wide Web.

In this context, the term "bus subsystem" is used generically so as to include any mechanism for letting the various components and subsystems communicate with each other as intended. With the exception of the input devices and the display, the other components need not be at the same physical location. Thus, for example, portions of the file storage system could be connected via various local-area or wide-area network media, including telephone lines. Similarly, the input devices and display need not be at the same location as the processor, although it is anticipated that the present invention will most often be implemented in the context of PCs and workstations.

Bus subsystem 32 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The client computer may be a desktop system or a portable system.

The user interacts with the system using user interface devices 37' (or devices 37 in a standalone system). For example, client queries are entered via a keyboard, communicated to client processor 30', and thence to modem or network interface 40' over bus subsystem 32'. The query is then communicated to server 20 via network connection 45. Similarly, results of the query are communicated from the server to the client via network connection 45 for output on one of devices 37' (say a display or a printer), or may be stored on storage subsystem 35'.

1.2 Text Processing (Software) Overview

The server's storage subsystem 35, as shown in FIG. 1, maintains the basic programming and data constructs that provide the functionality of the present invention. The software of the present invention is designed to (1) process text stored in digital form (documents) or entered in digital form on a computer terminal (queries) to create a database file recording the manifold contents of the text; (2) match discrete texts (documents) to the requirements of a user's query text using various representations of the documents and the user query; (3) combine the results obtained from matching the alternative representations of queries and documents to produce a single combined match result for each document in response to the query; and (4) display a list of documents based on the single combined match scores for the documents. The present invention provides rich, deep processing of text by representing and matching documents and queries at the lexical, syntactic, semantic and discourse levels, not simply by detecting the co-occurrence of words or phrases. Users of the system are able to enter queries as fully-formed sentences, with no requirement for special coding, annotation or the use of logical operators.

The system is modular and performs staged processing of documents, with each module adding a meaningful annotation to the text. For matching, a query undergoes analogous processing to determine the requirements for document matching. The system generates multiple representations of documents and queries including both conceptual and term-based representations of the documents and queries. It is convenient to refer to the collection of various representations which the system produces for each document or for each query as "the alternative representations" for that document or query. Put another way, a reference to "the alternative representations," should be taken to encompass a single representation, or any or all of the plurality of representations.

The processing modules include a set of processing engines, shown collectively in a processing engine block 50, and a query-document matcher and dynamic score combiner (matcher/combiner) 55. Matcher/combiner 55 matches the different alternative representations of the documents with the corresponding alternative representations of the queries. The match scores corresponding to the alternative representation matches are then dynamically combined using a evidence combination regime to generate a single combined match score for each retrieved document. According to an aspect of the present invention, matcher/combiner 55 receives additional information, such as information derived from the query and retrieved documents, and uses that additional information to tailor the combination regime to improve retrieval results for the particular query.

It should be understood, however, that by the time a user is entering queries into the system, the relevant document databases will have been processed and annotated, and various data files and data constructs will have been established. These are shown schematically as a "Document Database and Associated Data" block 60, referred to collectively below as the document database. An additional set of resources 65, possibly including some derived from the corpus at large, is used by the processing engines in connection with processing the documents and queries. Alternatively, documents can be processed and annotated on the fly as they arrive in real time.

User interface software 70 allows the user to interact with the system. The user interface software is responsible for accepting queries, which it provides to processing engine 50. The user interface software also provides feedback to the user regarding the system's interpretation of the query, and accepts responsive feedback from the user in order to reformulate the query. The user interface software also presents the retrieved documents as a result of the query to the user and reformats the output in response to user input. User interface software 70 is preferably implemented as a graphical user interface (GUI), and will often be referred to as the GUI.

User interface software 70 also facilitates user relevance feedback which may be used to tailor the dynamic evidence combination regime to suit the query. According to an aspect of the invention, the user can specify the most relevant documents that were retrieved in response to a particular query, and the system modifies the evidence combination regime (function) in accordance with the particular documents specified, so that when that query is rerun, the evidence combination regime is better tuned for the query and improves retrieval effectiveness.

1.3 GUI Interaction and Information Retrieval Overview

Figure 2:
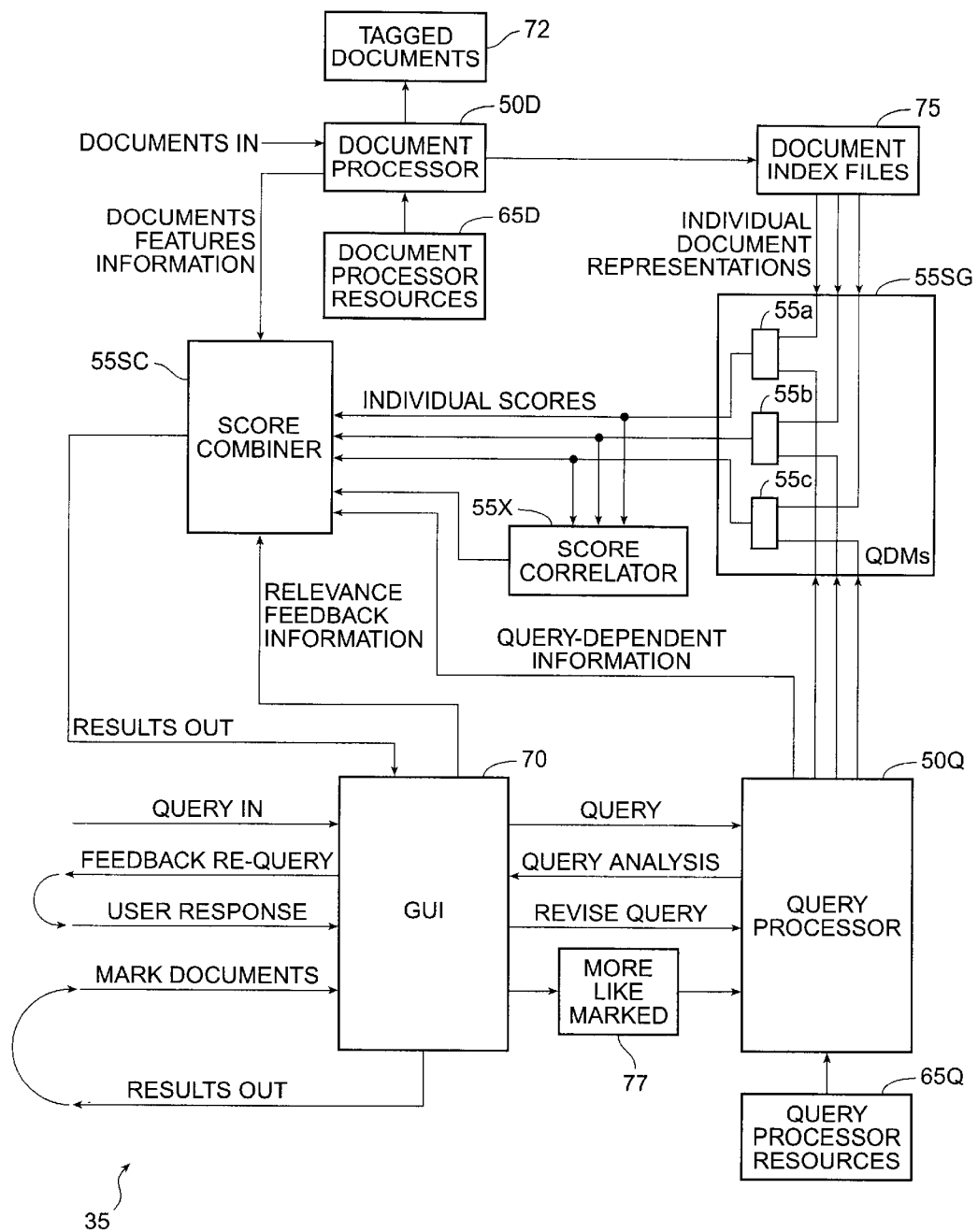
FIG. 2 is a block diagram depicting components of an information retrieval system for combining a plurality of evidence sources according to an embodiment of the present invention.

FIG. 2 is a more detailed block diagram of the text processing portion of the system, showing the nature of the interactions between the user and the system. In the figure, processing engine block 50 has been broken into document processing engines 50D, collectively referred to as the document processor, and query processing engines 50Q, collectively referred to as the query processor (QP). Each has its own resources, shown as document processor resources 65D and query processor resources 65Q. It should be understood that some of the resources can be shared resources.

GUI 70 is shown as a single block with inputs and outputs, as well as links to matcher/combiner 55, QP 50Q, and an additional module 77, called "More Like Marked" (MLM). As well as providing exceptionally rich and powerful document and query representations, user interface enhancements allow the user to interact with the retrieval process.

Documents are shown as being input to document processor 50D, which outputs a set of tagged documents 72 and a document index file 75, which stores alternative representations of the documents for use by matcher/combiner 55. Similarly, queries are shown as being input to GUI 70, and communicated to query processor 50Q, which generates an alternative representation of the query for use by the matcher. As noted above, and will be described in detail below, the alternative representation for a document or a query typically includes several different types of information that the system has generated based on the contents of the document or query.

Matcher/combiner 55 is shown in greater detail in FIG. 2. In particular, the matcher/combiner is shown as comprising a separate match score generator 55SG having a plurality of individual matchers 55a, 55b, and 55c, along with a score combiner 55SC and an associated score correlator 55X. The individual matchers operate on the different alternative representations of the documents and the queries. While FIG. 2 shows three such matchers 55a–55c for simplicity, the specific embodiment of the invention uses six matchers, corresponding to six different alternative representations for documents and queries. Each matcher executes the query by comparing that matcher's query representation to that matcher's corresponding document representation, and provides a score indicating a measure of similarity indicating the relative significance of the document to the substance of the query.

The individual scores are communicated to score combiner 55SC and also to score correlator 55X. Score combiner 55SC uses a combination regime to dynamically combine the individual scores to provide a combined score for each document. Score combiner 55SC receives additional input including query and document specific information, correlation information, and optionally relevance feedback information from the user, and uses the additional information to tailor the combination regime (function) to the particular query. Score combiner 55SC provides its results to GUI 70 for display and other action. Further details regarding the functioning of matcher/combiner 55 are discussed below.

As stated above, GUI 70 allows users to enter queries to be executed by the information retrieval of the present invention. After queries are executed, the search results are displayed to the user on GUI 70. In a specific embodiment of the present invention, before the query representation is sent to the matcher/combiner, results of the query processing (indicating the query representation) are displayed for the user. This provides the user an opportunity to provide input specifying modification of the query representation. This user feedback is shown schematically as a semi-elliptical arrow in the figure. QP 50Q modifies the query representation accordingly before sending the query representation to matcher/combiner 55.

After the query has been executed and the search results displayed to the user, the user may then provide feedback to the system by marking documents that the user considers particularly relevant. The representations of these particularly relevant documents are then used by MLM module 77 to create a further revised query for execution. This feedback based on document relevance is referred to as relevance feedback. According to an aspect of the present invention, relevance feedback information may be also used by score combiner 55SC to modify the evidence combination regime to improve the information retrieval process for a given query. The use of relevance feedback by score combiner 55SC should not be confused with the use of relevance feedback by MLM module 77, which reformulates the query (rather than the evidence combination regime) in accordance with the marked documents.

2.0 Document Processing

Figure 3:
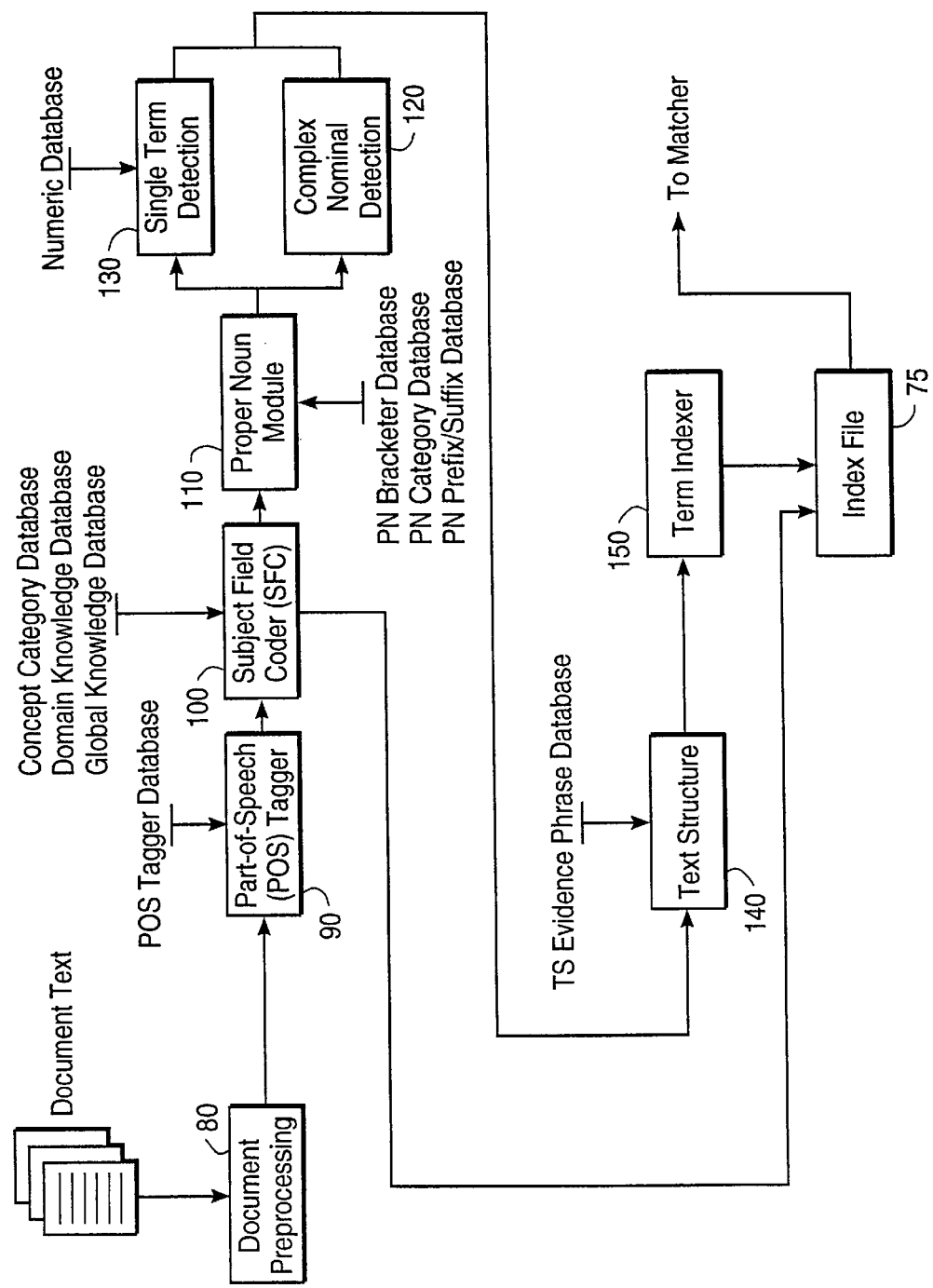
FIG. 3. is a block diagram of a document processor for generating alternative representations of the documents.

FIG. 3. is a block diagram showing the document processing modules within document processor 50D, and some associated resources. The set of modules depicted in FIG. 3 are responsible for generating the various alternative representations (conceptual, term-based) of each document. These modules include:

- a preprocessor 80;
- a part of speech (POS) tagger 90, with its associated POS, end of sentence detection, and lexical clue databases;
- a subject field coder (SFC) 100, with its associated concept category database containing a hierarchy of concept categories for all words, domain knowledge concept category correlation matrix database used to disambiguate concept categories at the domain level, and global knowledge concept category sense-frequency database used to disambiguate concept categories at the global level;
- a proper noun (PN) categorizer (PNC) 110, with its associated proper noun bracketer database used to bracket PNs with embedded conjunctions and/or prepositions, proper noun category databases used to categorize PNs, proper noun prefix/suffix database used to identify PN categories by reference to the suffix or prefix, and proper noun clarification database which presents alternative proper names based on what user has typed in the query;
- a complex nominal (CN) detector 120, a single term detector 130, with its associated numeric information database used to identify and catalog numeric data types (currency, temperature, etc.);

a text structurer 140, with its associated text structure evidence phrase database used to gather evidence for a particular text structure; and a term indexer 150.

In the course of operation, SFC 100 and term indexer 150 write document information into database index file 75, which as mentioned above, is used for query matching.

Document preprocessor 80 transforms raw digital data files of text into a uniform format suitable for further processing by the information retrieval system. Preprocessing involves some discourse-level manipulation of text, such as the explicit decomposition of composite documents into appropriate sub-texts. The preprocessor further identifies various fields, clauses, parts-of-speech and punctuation in a text, and annotates a document with identifying tags for these units. The identification process occurs at the sentence, paragraph and discourse levels and is a fundamental precursor to later natural language processing and document-query matching.

POS tagger 90 identifies a plurality of grammatical forms and punctuation marks. The preferred implementation performs additional processing of text, numerals, and other markings and attributes.

Using the text output from the POS tagger, SFC 100 tags content-bearing words in a text with a disambiguated subject code using an online lexical resource of words whose senses are grouped in subject categories. This is described in detail in co-pending patent application Ser. No. 08/135,815, filed Oct. 12, 1993, entitled "NATURAL LANGUAGE PROCESSING SYSTEM FOR SEMANTIC VECTOR REPRESENTATION WHICH ACCOUNTS FOR LEXICAL AMBIGUITY," to Elizabeth D. Liddy, Woojin Paik, and Edmund Szu-Li Yu. The application mentioned immediately above, hereinafter referred to as "Natural Language Processing," is hereby incorporated by reference for all purposes.

A subject field code indicates the conceptual-level sense or meaning of a word or phrase. Words with multiple meanings (and hence multiple possible subject field code assignments) are disambiguated to a single subject field code using three evidence sources: local context, domain knowledge, global knowledge.

PNC 110 recognizes proper nouns, common nouns, group proper nouns and group common nouns from the documents. PN categorization is performed whereby a proper noun is assigned to a single category from various categories such as city, state, country, company, person, etc. The present invention is not dependent on a specific number of concept categories or a specific arrangement of categories.

Complex nominal (CN) detector 120 recognizes complex nominals (e.g., budget amendment bill, central nervous system) which are important information-bearing phrases detected by the present invention and used in the document-query matching process. CN phrases may be recognizable as adjacent noun pairs or sequences of non-predicating and predicating adjective(s) and noun(s).

Single term detector 130 detects certain typical English-language constructs such as nouns, conflated nouns, verbs, adverbs, adjectives, certain subject contents of documents, numbers, and numerically-related information such as currency symbols.

Text structurer 140 provides valuable information about the sense and meaning of a text [Liddy94c]. The text structurer is based on discourse theory [VanDijk88] which suggests that textual communication within a given community (journalism, law, medicine), or text of a certain genre (recipe, obituary, folk-tale) has a predictable schema. The schema serves as a reliable indication of how and where certain information endemic to a text-type will be displayed. The text structurer module produces an enriched representation of each text by computationally decomposing it into smaller, conceptually labeled components. The delineation of the discourse-level organization of document and query contents facilitates retrieval of those documents that convey the appropriate discourse semantics. In the current and preferred embodiment of text Structurer, a departure from earlier implementations, various structural annotations (tags) are assigned based upon various evidence sources, including the presence and logical arrangement of clauses, phrases and combinations of words and punctuation. These structural tags express important aspects which can contribute to relevancy in a text, including time, opinion, and intention.

The text structurer provides (1) temporal information about a text (past, present and future), and (2) information about the meta-contents or intention of the text (whether the text contains analysis, cause/effect information, predictions, quotations, or evaluative comments). Dependencies can exist between the assignment of temporal and intention-based tags.

Term indexer 150 indexes terms and SFC 100 indexes SFC vector data in related files, shown collectively as index file 75. Other document-based indexing is possible. The term index is a two-tier inverted file. The first level of the file contains terms, where a term can be a word (single term), a complex nominal, or a proper noun. The second level of the file contains postings (document references) with associated scores. The scores are an indication of the strength of the association between the term and the document. A single term will usually map to numerous postings, each with a score. Terms are also indexed with reference to their location within the text (both as logical paragraphs and regarding text structure).

Indexing involves extracting terms from the text, checking for stop words, processing hyphenated words, then stemming all inflected terms to a standard form. Finally, for each document the within document Term Frequency (TF) is calculated; the product of TF and the Inverse Document Frequency (IDF) is used as the basis for the postings score—a measure of the relative prominence of a term compared to its occurrence throughout the corpora. TF.IDF scores are also cataloged for a varying number of logical paragraphs in a given document.

A logical paragraph is a subsection of a complete document, which may contain one or several text paragraphs, depending on the length of the overall document. Documents are divided into logical paragraphs based on size and natural transitions in a text, such as paragraph boundaries or subhead boundaries. Later matching can occur within a logical paragraph, so as to highlight the most relevant logical paragraph or the portion of a long document deemed most relevant to a query. While the preferred implementation uses the 16-unit logical paragraph arrangement described above, alternative implementations are possible. One such implementation is to divide the document into an unrestricted number of subsections that correspond to each and all of the natural paragraph boundaries in a text.

Further details regarding document processing are discussed in co-pending U.S. patent application Ser. No. 08/696,702, filed Aug. 14, 1996, entitled "USER INTERFACE AND OTHER ENHANCEMENTS FOR NATURAL LANGUAGE INFORMATION RETRIEVAL SYSTEM AND METHOD" which is hereby incorporated by reference for all purposes.

3.0 Query Processing

Figure 4:
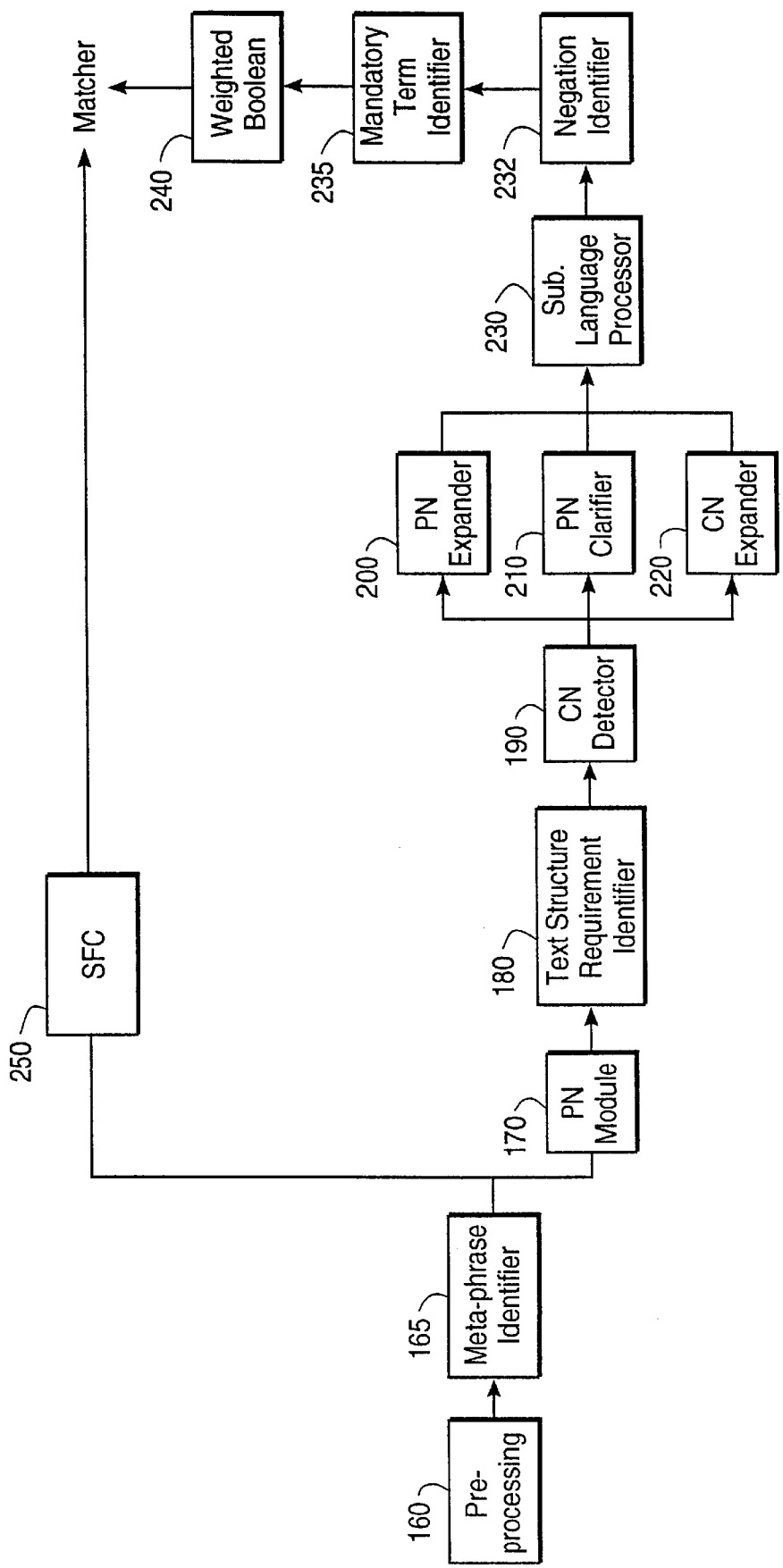
FIG. 4 is a block diagram of a query processor for generating alternative representations of a query.

FIG. 4 is a block diagram showing the query processing modules within query processor 50Q. Queries processing is different from document processing, although the evidence extracted from query text is very similar to the evidence extracted from document texts, and therefore some of the modules perform the same type of processing. The query processing modules within query processor (QP) 50Q that perform the processing to generate the alternative representations of each query include:

- a preprocessor 160;
- a meta-phrase identifier 165, with its associated meta-phrase evidence database used to identify meta-phrases in the query;
- a proper noun (PN) categorizer (PNC) 170;
- a text structure requirement identifier 180, with its associated text structure requirement database (similar to the text structure evidence phrase database, but for queries);
- a complex nominal (CN) detector 190,
- a PN expander 200, with its associated PN expansion database used to find synonymous expansions for stated PNs;
- a PN clarifier 210, with its associated PN clarification database;
- a CN expander 220, with its associated CN expansion database used to find synonymous expansions for stated CNs;
- a sublanguage processor 230, with its associated sublanguage processing database used to identify the logical form of the query;
- a negation identifier 232, with its associated negation database used to identify negative portions in the query;
- a mandatory term identifier 235, with its associated mandatory term database used to identify mandatory requirements stated in the query;
- a weighted Boolean processor 240; and
- a subject field coder (SFC) 250.

Query preprocessor 160 performs the same tasks for queries as preprocessor 80 performs for documents. Meta-phrase identifier 165 performs the task of detecting words or phrases in a query that are used to state (or expand upon) the query. These words and phrases are then removed from the query processing stream, and are not used as search terms. PNC 170 performs the same task for queries as PNC 110 does for documents.

Text-structure requirement identifier 180 performs a similar analysis of queries as text structurer 140 performs of documents. However, while the text structurer operates at the sentence level or on clause level, in the preferred embodiment, the text-structure requirement identifier operates upon the whole query. That is, the whole query is categorized by tense requirement (past, present future), and by intention requirement (prediction, analysis, facts, etc.). Thus an understanding is gained of the overall temporal and discourse aspect requirements of the query. An alternative implementation would assign tags at the individual sentence or clause level.

The CN detection techniques for queries are the same as those used by CN detector 120 for documents. PN expander 200 automatically provides the system user with synonyms, hyponyms, or member meronyms for proper nouns contained in the query. The user can decide whether or not to use these expanded terms in the query.

PN clarifier 210 automatically provides the system user with ambiguous interpretations for proper nouns contained in the query. The user can decide or clarify whether or not to use certain interpretations of the proper nouns in the query.

CN expander 220 provides the system user with synonyms for phrases contained in their query. The user can decided whether or not to use these synonyms in the query.

The initial sub-language processing of the query involves tokenization, standardization and the resolution of anaphoric references. After this initial processing, the natural language query is decomposed to an ensemble of logical or pseudo-logical assertions linking portions of the query, or various terms (or groups of terms). A series of operators are used to make these logical and pseudo-logical assertions. Various linguistic clues such as lexical clues and punctuation are used to determine the logical form of the query: The basis of this system is a sub-language grammar which is rooted in generalizations regarding the regularities exhibited in a large corpus of query statements, The sub-language relies on items such as function words (articles, auxiliaries, and prepositions), meta-text phrases, and punctuation (or the combination of these elements) to recognize and extract the formal logical combination of relevancy requirements from the query. The sub-language processor uses the principles of text structure analysis and models of discourse to automatically identify conjunction, disjunction, mandatory, positive, and negative portions of a query.

Negation identifier 232 performs negation detection and identifies terms in the positive and negative portions of the query. Mandatory term identifier 235 identifies terms in the mandatory and non-mandatory portions of the query.

Weighted boolean processor 240 assigns a weighed boolean score to each term in the query using principles of fuzzy Boolean logic. These scores may then be used for matching purposes.

Subject field codes (SFC) module 250 assigns subject field codes to each substantive word in the positive portion of the query. The method of assignment and the arrangement of codes is similar to that used by SFC 100 for document vector generation as described above.

Further details regarding document processing are discussed in co-pending U.S. patent application Ser. No. 08/696,702, filed Aug. 14, 1996, entitled "USER INTERFACE AND OTHER ENHANCEMENTS FOR NATURAL LANGUAGE INFORMATION RETRIEVAL SYSTEM AND METHOD" which is hereby incorporated by reference for all purposes.

4.0 Document Matching and Retrieval 4.1 Matching Overview

Matcher/combiner 55 performs matching between documents and the query. Based on the results of the matching, each document is assigned a similarity score denoting the relative significance of the document to the substance of the query. Documents with sufficiently high scores are arranged in ranked order and displayed to the user. Matcher/combiner 55 may use a number of evidence sources for determining the similarity of documents to a query request. These evidence sources include but are not restricted to complex nominals (CNs)*, proper nouns (PNs)*, subject field codes (SFCs), single terms*, text structure, presence of negation, and/or mandatory requirements (*–CNs, PNs, and Single Terms are collectively called "terms."). Using the evidence sources mentioned above, the matcher determines the similarity or suitable association between the query and documents.

Documents may also be arranged for the user based on a two-tier ranking system. The highest-level ranking mechanism is a system of folders. Documents are placed within folders based on various criteria, such as the presence or absence of mandatory terms. The lower-level ranking mechanism sorts documents within each folder based on criteria such as similarity score, document date assignment, etc. The operation and function of the matcher is not dependent on the number or specific interrelationship of the folders, or on the within-folder mechanisms used to rank and display documents, or on the number of evidence sources used to compute document relevance scores as described below.

Foldering is based on the presence or absence and logical relationship in a document of query terms, negation and mandated terms. Within folders, document rank position is computed using match scores for the whole document and for up to 8 segments, or logical paragraphs, that make up the document (see earlier discussions for an explanation of logical paragraphs).

4.2 Scoring of Documents using Dynamic Evidence Combination

As stated above, several evidence sources or alternative representations of the documents and queries may be used for matching and scoring documents according to the present invention. Different combination techniques may then be used to combine the individual scores to form a single combined relevance score for each document. Documents are then ranked based on their combined relevance score.

In a preferred embodiment of the present invention, a dynamic evidence combination regime is used to combine scores based on the various evidence sources or alternative representations of the query and documents. This strategy is motivated by the expectation that, just as no single retrieval approach is consistently the most effective for all queries, similarly no single evidence combination method is consistently the most effective for all queries.

The evidence combination techniques used by the present invention combine one or more match scores generated by individual matchers, three of which (55a–55c) are shown in FIG. 2. Each matcher operates on a different alternative representation of the query and the documents, producing a single match score for each document. The match scores corresponding to the various alternative representation matches are then combined using a dynamic evidence combination regime whose inputs include the set of match scores generated by the plurality of retrieval approaches using alternative representations for a query and a given set of documents, and whose output is a single combined match score for each of the retrieved documents corresponding to the query. Various additional inputs, such query and document dependent information, may be used by the combiner to adjust the dynamic combination regime for the particular query. Since each independent alternative representation match contributes to the overall match score for the query, the effectiveness of the information retrieval system is improved. Additionally, since the combination regime is dynamically tailored for a particular query, the effectiveness of the information retrieval process is further enhanced and yields higher retrieval effectiveness than static combination techniques.

The dynamic combination regime defines the manner of combining the scores generated by individual matchers 55a–55c, for each of the documents so as to produce the highest possible ratio of relevant documents to retrieved documents for the particular query. In a specific embodiment, score combiner 55 determines weights to be assigned to the individual scores indicating the relative importance of each representation match score in the combination process.

In a particular implementation, six evidence sources or alternative representations are used for matching by the individual matchers. These include:

(1) the Positive Term (PT);
(2) Subject Field Coder (SFC) matcher;
(3) a variant on the PT using a somewhat different index lacking complex nominals (CNs) and proper nouns (PNs);
(4) a probabilistic matcher where the query representation lacks the structured logical representation of the PT matcher (the basic operation is adding term frequencies for the terms in the query);
(5) a vector matcher based on N-grams; and
(6) a matcher based on latent semantic indexing (principal components analysis) which maps the query to a reduced dimensionality vocabulary (such as collapsing synonyms).

The Positive Term (PT) is a fuzzy Boolean combination of the TF.IDF scores for the terms in the positive portion of the query. The product of TF.IDF for a given term in a document provides a quantitative indication of a term's relative uniqueness and importance for matching purposes. A natural-log form of the equation for TF.IDF, where TF is the number of occurrences of a term within a given document, and IDF is the inverse of the number of documents in which the term occurs, compared to the whole corpus, as shown below:

$$TF.IDF = (\ln(TF)+1) \cdot \ln(N+I/n)$$

where "N" is the total number of documents in the corpus, and "n" is the number of documents in which the term occurs. These TF.IDF scores are calculated for the documents.

The way that the TF.IDF scores are combined for the PT is in accordance with the combination of scores based on the structured logical representation of the query. The scores for the nodes are equal to the TF.IDF scores for the terms.

For the Subject Field Code (SFC) Vector match score, first the subject vector for each text (document or query) is normalized using a term weighting formula in order to control for the effect of document length. The matching score between the query and document is determined by the correlation or association between them, which is computed by a similarity measure that treats the query and document vectors as two data points in the multi-dimensional space and then computes the distance between these two data points.

As previously stated, individual matchers 55a–55c operate on different alternative representations of the documents and the queries. Each matcher executes the query by matching the matcher's query representation to that matcher's corresponding document representation, and provides a match score representing a measure of similarity between the query and the documents. The documents retrieved by each matcher along with each document's individual score are then communicated to score combiner 55SC and to score correlator 55X.

While it is convenient to consider a given matcher as matching its representation of the query against its representation of all the documents, it is in general inefficient to match the query against all the documents. The same result can be, and is, achieved by storing the documents representations as inverted indexes, which store pointers to those documents that will have a non-zero match score. For term-based representations, the index will be indexed by terms, and will have, for each term, pointers to all the documents containing that term.

Score correlator 55X determines the amount of correlation that exists among the scores returned by the different matchers and provides this information to score combiner 55SC. This information is helpful for predicting the optimal score combination regime for a given query. For example, suppose three retrieval approaches with similar effectiveness generally produce match scores that are not highly correlated. A score combination that weights their contributions equally may be suitable. However, if two of these retrieval approaches produce highly correlated scores for a particular query, and reflect a single evidence source for this query, then continuing to weight the three scores equally would give this single evidence source twice as much weight as the other evidence sources and would thus amplify the errors associated with the correlated retrieval approaches without introducing new relevant items. In order to avoid such a skewed result, the correlated sets of scores are weighted down by score combiner 55SC. Thus, correlation information is helpful for predicting the optimal score combination regime for a given query and facilitates the dynamic evidence combination process.

Conceptually, in a specific embodiment, a matcher's output for a given query can be viewed as a document vector whose elements correspond to the documents with the elements being weighted by the scores of the documents. Combining the scores is tantamount to combining the document vectors. Correlating the scores is correlating the document vectors for the pair of matchers. In actual implementations, there is no need to generate document vectors for all the documents, since only documents for which one of the matchers provides a non-zero score need be considered.

Figure 5:
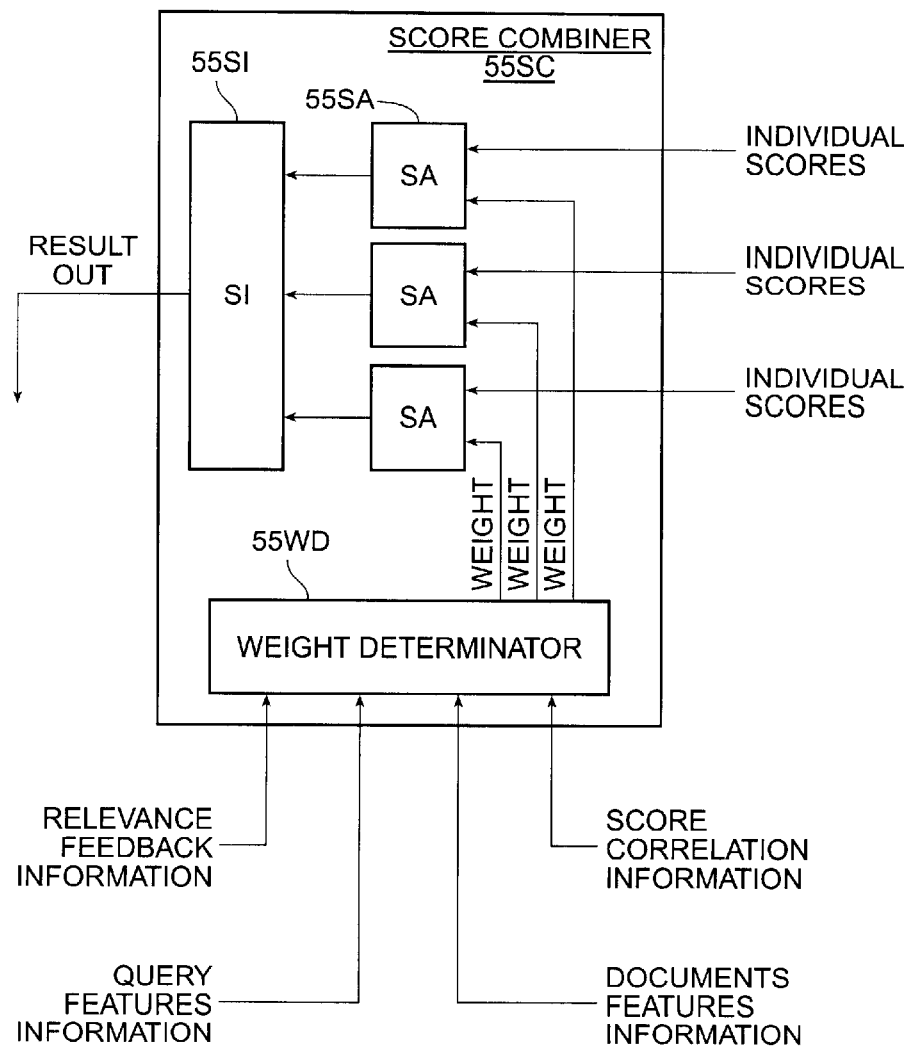
FIG. 5 is a block diagram of a score combiner for combining individual match scores using dynamic evidence combination according to an embodiment of the present invention.

FIG. 5 is a block diagram of score combiner 55SC according to an embodiment of the present invention. Score combiner 55SC combines individual match scores using a dynamic evidence combination regime to produce a combined match score for each retrieved document. As shown, score combiner 55SC comprises a weight determinator 55WD, one or more score adjusters 55SA, and a score integrator 55SI. While FIG. 5 shows three score adjusters corresponding to the three individual matchers shown in FIG. 2, the specific embodiment of the invention uses six score adjusters corresponding to the six different alternative representations for documents and queries.

Weight determinator 55WD, score adjusters 55SA, and score integrator 55SI in conjunction determine the combination regime for a particular query such that the ratio of relevant documents to the number of retrieved documents for the query is maximized. Based on input information, weight determinator 55WD determines weights to be applied to each of the individual match scores generated by individual matchers 55a–55c. The weights indicate the relative importance of each particular match score in determining the combined score. The input information which is used to determine the weights may include score correlation information received from score correlator 55X, documents features information received from document processor 50D, query features information received from query processor 50Q, and optionally relevance feedback information received from the user via GUI 70.

The query features information typically includes query specific information derived from the query itself. This may include stylistic features such as query length, grammatical attributes, meanings of terms in the query and their synonyms.

This information is generated by query processor 50Q and is shown as an input to the score combiner.

The documents features information typically includes information derived from the retrieved document whose individual scores are to be combined. This information is generated by document processor 50D and may include the length of the document.

Relevance feedback information, used in some embodiments, is generated after the query is executed, and is based on user feedback as to the relevance of the retrieved documents. After the query has been executed and the search results displayed to the user, the user may then provide feedback to the system by marking documents that the user considers particularly relevant. This feedback based on document relevance is referred to as relevance feedback information. Weight determinator 55WD uses the relevance feedback information to modify the combination regime to better suit the particular query in view. This relevance feedback is not to be confused MLM module 77, which reformulates the query (rather than the evidence combination regime) in accordance with the marked documents.

The weights generated by weight determinator 55WD may then be fed to each of the score adjusters 55SA which also receive the individual match scores generated by individual matchers 55a–55c. The score adjusters adjust the match scores based on the weights provided by weight determinator 55WD, and provide the adjusted weighted scores to score integrator 55SI. Score integrator 55SI accumulates the adjusted weighted scores received from the various score adjusters to produce a single combined match score for each retrieved document. The retrieved documents may then be ranked based on their single combined scores. The ranked document may then be provided to GUI 70 for display to the user. This list represents the results of executing the query for a corpus of documents.

4.3 Implementing the Score Combiner using a Neural Network and Linear Functions

In a preferred embodiment, linear combination functions are used to define the dynamic combination regime. Based on the input information, weight determinator 55WD determines linear coefficients or weights to be applied to each of the individual match scores. In a specific embodiment, weight determinator 55WD is implemented as a neural network that receives the input information and adjusts linear coefficients for each of the alternative representation match scores.

In a specific embodiment, a feed-forward, multi-layer neural network is used whose output nodes are the linear weights to be applied to each of the individual match scores. The neural network models functions using a set of nodes arranged into layers including an input layer, and output layer, and one or more intermediate hidden layers. The nodes are connected to each other by weighted links.

Figure 6:
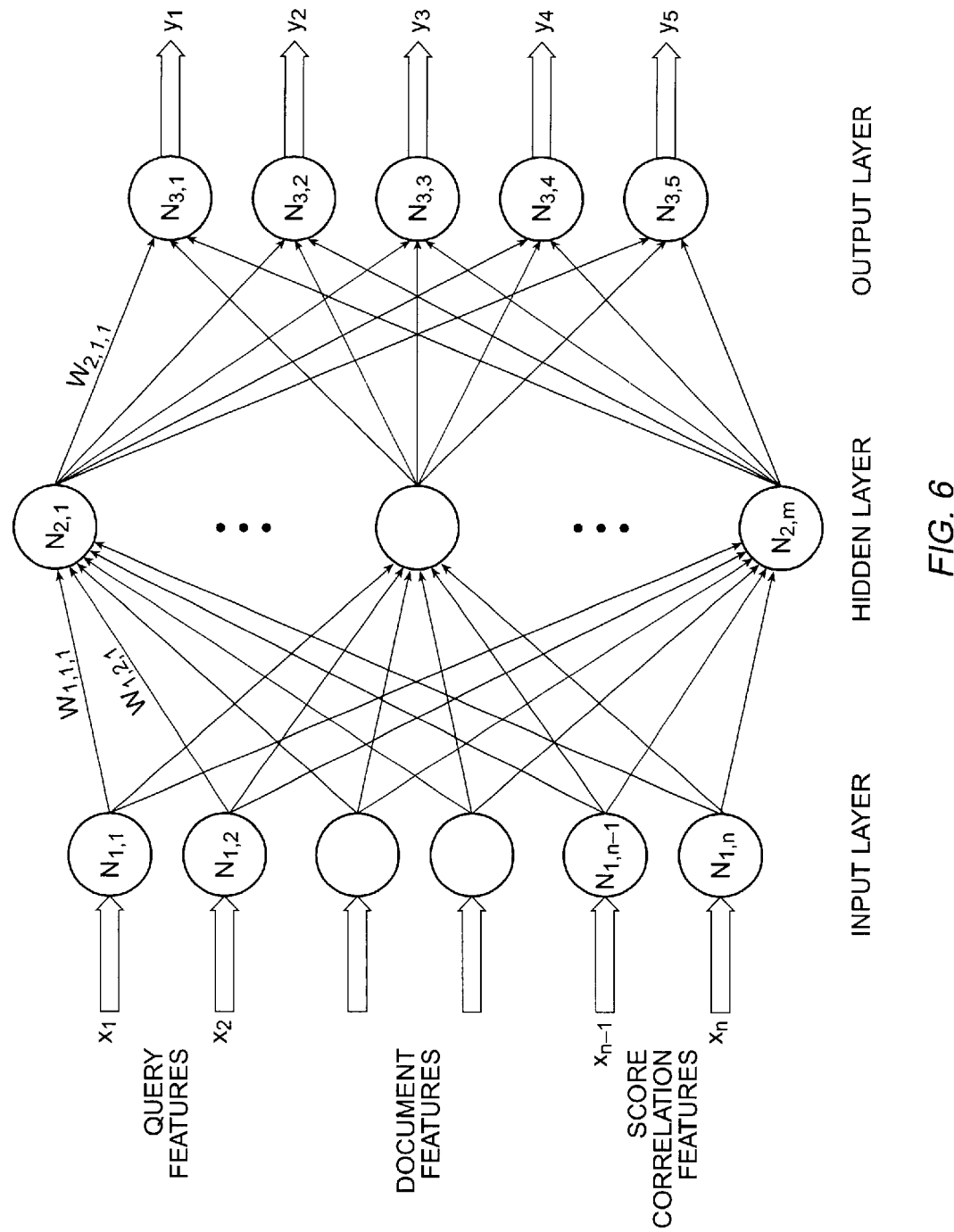
FIG. 6 depicts a neural network for implementing a weight determinator according to an embodiment of the present invention.

FIG. 6 depicts an example of a neural network which may be used to implement weight determinator 55WD. As shown in FIG. 6, the neural network comprises a set of nodes arranged into layers, including an input layer, an output layer, and a hidden layer. The nodes are connected to each other by weighted links. The first layer of nodes is made up of a number "n" of input nodes labeled $(N_{1,1})$, $(N_{1,2})$, ..., $(N_{1,n})$ corresponding to the number of input features which may include query specific features, document specific features, score correlation features, and optionally relevance feedback information. The second layer of the neural network comprises "m" number of hidden nodes labeled ($N_{2,1}$), ($N_{2,2}$), . . . , ($N_{2,m}$). The third layer of the neural network comprises output nodes corresponding to weights to be applied to individual scores generated by the individual matchers 55a–55c. While FIG. 6 shows five output nodes labeled ($N_{3,1}$), ($N_{3,2}$), ($N_{3,3}$), ($N_{3,4}$), and ($N_{3,5}$) for simplicity, the specific embodiment of the invention uses six output nodes, corresponding to six different alternative representations for documents and queries.

The node layers are connected by links characterized by numeric weights <$W_{l,i,j}$> which connect the i node in layer "l" to the $j^{th}$ node in. layer (l+1). Each node of the input layer (Layer 1) has a link to each of the hidden nodes (Layer 2), and each of the hidden nodes has a link to each of the output nodes (Layer 3).

When an input ($x_1$, . . . , $x_n$) is presented to the network, the input is propagated towards the output layer in the following manner:

(1) Node ($N_{1,1}$) sends its input ($x_1$) to node ($N_{2,1}$) which receives it as ($x_1 * W_{1,1,1}$). Similarly, node ($N_{1,1}$) sends its input $x_1$ to the remaining nodes in the hidden layer, which receive it as the product of $x_1$ and the weight associated with the link between ($N_{1,1}$) and the node in the hidden layer. Node ($N_{1,2}$) sends its input ($x_2$) to node ($N_{2,1}$) which receives it as ($x_{2*W1,2,1}$). Similarly, node ($N_{1,2}$) sends input $x_2$ to the remaining nodes in the hidden layer, which receive it as the product of $x_2$ and the weight associated with the link between ($N_{2,1}$) and the node in the hidden layer. The remaining inputs nodes propagate their values to the hidden layer in the same fashion.

(2) Node ($N_{2,1}$) sums the signals it receives ($x_1 * W_{1,1,1} + \ldots + x_1 * W_{1,n,1}$), and applies a sigmoid function, to generate its output, ($O_{2,1}$), which is then sent to node ($N_{3,1}$) as ($O_{2,1} * W_{2,1,1}$), to node ($N_{3,2}$) as ($O_{2,1} * W_{2,1,2}$), and similarly to nodes ($N_{3,3}$) to ($N_{3,5}$) as ($O_{2,1} * W_{2,1,3}$), ($O_{2,1} * W_{1,2,4}$), and ($O_{2,1} * W_{2,1,5}$), respectively. Nodes ($N_{2,2}$) to ($N_{2,m}$) perform similar operations on their received signals to produce output signals ($O_{2,i} * W_{2,i,j}$), where "i" is the node number in the hidden layer, and "j" is the node number in the output layer. The sigmoid function "squashes" an input by imposing upper and lower asymptotes on the output as the input goes to positive or negative infinity. A common sigmoid is the logistic transformation:

$$f(x) = \frac{1}{1+e^{-x}}.$$

(3) Node ($N_{3,1}$) sums the signals it receives ($O_{2,1} * W_{2,1,1} + \ldots + O_{2,m} * W_{2,m,1}$), and applies a sigmoid function, to generate its output, ($y_1$). Nodes ($N_{3,2}$) to ($N_{3,5}$) perform similar operations on the signals they receive to generate outputs ($y_2$) to ($y_5$). Although only five outputs are shown in FIG. 6, the specific embodiment of the invention generates six outputs corresponding to the six different alternative representations for documents and queries.

An important characteristic of the technique described above is that it is capable of approximating any function, given a sufficient number of hidden layers and nodes [Hertz91 pp. 142–4]. The internal weights for links are set by "training" the neural network.

Feedforward networks are generally trained using a technique called "backpropagation." In backpropagation, the difference between a training case's "target" output and its "actual" output is propagated back towards the input nodes in the form of weight adjustments. The formulae used for the weight adjustments depend on an error function applied to this difference, usually the square of the difference. Each training case is presented to the network for weight adjustment, until the training cases have been exhausted. Then another iteration of the same training cases is presented, possibly in a different order. Iterations continue until the sum of squared errors across all training cases falls below some threshold, or until a maximum number of iterations is reached. To prevent overfitting, the weights attained after each iteration are applied to a test sample of cases that are different from the training cases. If the sum of squared errors for the test sample for an iteration exceeds the sum for the previous iteration, the network may have begun to represent "noise" in its weights, indicating that training should be stopped. This protection against overfitting is referred to as cross-validation.

The present invention uses a variant of the general backpropagation algorithm since the usual backpropagation algorithm is not appropriate for training the neural network to predict the optimal weights for the linear fusion functions. The goal of the training is to predict a set of outputs that, when used in the linear fusion function, will result in the highest possible ranking of relevant documents. To optimize the network link weights for this goal, the error that is propagated back through the network is inflated by a function of the difference between the ranking of the relevant documents (for the current set of network link weights) and the best ranking possible. The training technique is thus designed to predict the linear weights so as to maximize the proportion of relevant documents to retrieved documents. It should be apparent to those of ordinary skill in the art that although a specific neural network implementation is described above, other neural network implementations and training procedures are also encompassed within the scope of the present invention.

5.0 Using Relevance Feedback for Performing Dynamic Evidence Combination

Since queries in information retrieval environments are generally run repeatedly as new documents are added to the corpus of document, the user is able to judge the relevancy of newly retrieved documents at each execution cycle of the query. After the query has been executed and the search results displayed to the user, the user may then provide feedback to the system by marking documents that the user considers particularly relevant. The user's relevancy judgments may then be used to dynamically modify the evidence combination regime for subsequent retrievals of documents for the same query. This further increases the ratio of relevant documents among the retrieved documents.

6.0 Developing "Informed" Queries using Relevance Feedback

Relevance feedback may also be used to refine queries entered by the user which are represented in the form of query vectors. Relevance feedback is accomplished by combining the vectors of user-selected documents or document clusters with the original query vector to produce a new, "informed" query vector. The vector for the original query and all user-selected documents are weighted and combined to form a new, single vector for re-ranking and re-clustering. The "informed" query vector is matched against all document vectors in the corpus or those that have already passed the cut-off filter. Relevant documents will be re-ranked and re-clustered.

The "informed" query vector may then be compared to the set of vectors of all documents above the cut-off criterion produced by the initial query (or for the whole corpus, as desired), and a revised query-to-document concept similarity score may be produced for each document. These similarity scores are the system's revised estimation of a document's predicted relevance and may then be used by the regression or dynamic evidence combination techniques to generate a single match score for each retrieved document.

7.0 Graphic User Interface Overview

In general, the graphic user interface (GUI) for the information retrieval system according to the present invention is a sequence of related screens, windows and associated graphical environments that facilitate interactions with users.

Specifically, the GUI allows users to: interact with the system to select data resources; to create a natural language query; to alter, expand or otherwise interact with the computer-generated query representation; to select criteria for retrieving, ranking and displaying documents; to view results of query execution; and to re-submit a query based on the contents of documents considered highly relevant. The GUI allows the user to interact and influence the various processing elements of the information retrieval system described earlier in this application.

Like the present invention, the GUI can exist is a variety of computing environments using a variety of software, hardware and operating systems. The specific instantiation discussed in this application is for the Microsoft Windows operating environment, from the Microsoft Corporation, Redmond, Seattle, WA. Other instantiations for the GUI include an online, world-wide web-based system using the Netscape Navigator browsing tool, available from Netscape Corporation, Mountain View, Calif. Other versions of the GUI client system are possible for other computing environments. The general features and methods used with the GUI and discussed in this application are independent of the computing environment.

8.0 Conclusion

In conclusion, a computer system and method are disclosed for information retrieval that, through a sequence of computer and user interactions, allow the expression and clarification of complex query statements and the retrieval and display of relevant documents using natural language processing (NLP) techniques. The present invention improves information retrieval effectiveness by dynamically combining evidence information produced by a plurality of retrieval systems matching alternative representations of queries and documents. The combination regime used for combining the various alternative representation match scores is dynamically modified to suit a particular query such that the ratio of relevant documents to retrieved documents is maximized.

Although specific embodiments of the invention have been described, various modifications, alterations, alternative constructions, and equivalents are also encompassed within the scope of this application. For example, the described invention is not restricted to operation within certain specified computer environments, but is free to operate within a plurality of computer environments. Additionally, although the present invention has been described using a particular series of transactions, it should be apparent to those of ordinary skill in the art that the scope of the present invention is not limited to the described series of transactions.

While the present invention has been described using a particular combination of hardware and software, it should be recognized that other combinations of hardware and software are also within the scope of the present invention. Alternatively, the present invention may be implemented only in hardware or only in software, or a combination of hardware and software or in combinations with other hardware and software elements.

The specification and drawings are, accordingly, to be regarded in an illustrative rather than a restrictive sense. It will, however, be evident that other modifications and changes may be made thereunto without departing from the broader spirit and scope of the invention as set forth in the claims.

9.0 References

The following references are incorporated by reference for all purposes:

[Liddy93] Liddy, E. D., Paik, W., Yu, E. S. & McVearry, K. An overview of DR-LINK and its approach to document filtering. *Proceedings of the ARPA Workshop on Human Language Technology*. Publication date: 1993.

[Liddy94a] Liddy, E. D. & Myaeng, S. H. (1994). DR-LINK System: Phase I Summary. *Proceedings of the TIPSTER Phase I Final Report.*

[Liddy94b] Liddy, E. D., Paik, W., Yu, E. S. & McKenna, M. (1994). Document retrieval using linguistic knowledge. *Proceedings of RIAO '94 Conference.*

[Liddy 94c] Liddy, E. D., Paik, W., Yu, E. S. Text categorization for multiple users based on semantic information from an MRD. *ACM Transactions on Information Systems*. Publication date: 1994. Presentation date: July, 1994.

[Liddy95] Liddy, E. D., Paik, W., McKenna, M. & Yu, E. S. (1995) A natural language text retrieval system with relevance feedback. *Proceedings of the 16th National Online Meeting.*

[Gentner81] Gentner, David. (1981) Some interesting differences between verbs and nouns. *Cognition and brain theory* 4(2), 161–178.

[Hanson90] Hanson, Stephen Jose. (1990) Conceptual clustering and categorization: bridging the gap between induction and causal models. In Yves Kodratoff & Ryszard Michalski (eds.) *Machine Learning, Volume III*. Morgan Kaufmann Publishers: San Mateo, Calif.

[Hertz91] Hertz, J., Krogh, A., Palmer, R. G. *Introduction to the Theory of Neural Computation*. Addison West, 1991.

[Paik93a] Paik, W., Liddy, E. D., Yu, E. S. & McKenna, M. Categorizing and standardizing proper nouns for efficient information retrieval. *Proceedings of the ACL Workshop on Acquisition of Lexical Knowledge from Text*. Publication date: 1993.

[Paik93b] Paik, W., Liddy, E. D., Yu, E. S. & McKenna, M. Interpretation of Proper Nouns for Information Retrieval. *Proceedings of the ARPA Workshop on Human Language Technology*. Publication date: 1993.

[Salton89] Salton, Gerald. (1989) *Automatic Text Processing* Addison-Westley Publishing: Reading Mass.

[VanDijk88] VanDijk, Teun A. (1988) *News Analysis*. Lawrence Erlbaum Associates: Hillsdale, N.J.

What is claimed is:

1. A method of operating a computerized information retrieval system here information is retrieved from a database containing documents in response to user queries, the method comprising:

receiving a query specifying information to be retrieved;

processing the query to abstract the query to each of a plurality of alternative representations suitable for input to a database of documents, each document of which is abstracted to each of the plurality of alternative representations;

for each alternative representation, determining a set of documents, each of whose respective corresponding alternative representation bears a relationship to the alternative representation of the query representing a non-zero measure of similarity, the measure of similarity being referred to as an individual score;

combining the sets of documents, so determined, to define a combined set of documents, each document having a non-zero individual score for at least one of the plurality of alternative representations;

determining, for each query, a set of query specific parameters that depend on the query;

for at least some documents in the combined set, combining the individual scores according to a combination regime to produce a combined score, wherein the combination regime is a function of the plurality of individual scores and the set of query specific parameters.

2. The method of claim 1 further comprising:

generating a ranked list of documents from the combined set of documents on basis of the combined scores of the documents;

displaying the ranked list of documents;

receiving user input specifying selection of at least some of the documents from the displayed list of documents, the selected documents indicating documents relevant to the user;

determining relevance feedback information based on the selected documents; and for at least some documents in the combined set, recombining the individual scores according to the combination regime to produce a second combined score, wherein the combination regime for producing the second combined score is a function of the plurality of individual scores, the set of query specific parameters, and the relevance feedback information.

3. The method of claim 1 wherein the combination regime is a function of a characteristic of at least some of the documents' individual scores.

4. The method of claim 1 wherein the set of query specific parameters depends on the length of the query.

5. The method of claim 1 wherein the set of query specific parameters depends on grammatical attributes of the query.

6. The method of claim 1 wherein the set of query specific parameters depends on terms contained in the query.

7. The method of claim 6 wherein the set of query specific parameters depends on synonyms for the terms contained in the query.

8. The method of claim 1 further comprising:

determining document specific information for at least some documents of the combined set of documents; and wherein the combination regime is a function of the document specific information.

9. The method of claim 8 wherein the document specific information depends on length of the documents.

10. The method of claim 1 further comprising:

determining correlation information between the individual scores of the documents within the combined set of documents, the correlation information indicating a measure of the degree to which the individual scores exhibit similar distributions; and wherein the combination regime is a function of the correlation information.

11. The method of claim 8 wherein the combination regime is determined such that contribution of one or more individual scores towards the combined score is decreased if the correlation information between the individual scores exhibits a high degree of similar distributions.

12. A method of operating a computerized information retrieval system where information is retrieved from a database containing documents in response to user queries, the method comprising:

receiving a query specifying information to be retrieved;

processing the query to abstract the query to each of a plurality of alternative representations suitable for input to a database of documents, each document of which is abstracted to each of the plurality of alternative representations;

for each alternative representation, determining a set of documents, each of whose respective corresponding alternative representation bears a relationship to the alternative representation of the query representing a non-zero measure of similarity, the measure of similarity being referred to as an individual score;

combining the sets of documents, so determined, to define a combined set of documents, each document having a non-zero individual score for at least one of the plurality of alternative representations;

performing, for the combined set of documents, a correlation operation between first and second individual scores to determine a measure of the degree to which the first individual scores and the second individual scores exhibit similar distributions among the documents in the combined set;

for each document in the combined set, combining the individual scores according to a combination regime to produce a combined score for the document, the combination regime being determined at least in part by reducing the amount that the first and second individual scores contribute to the combined score as a function of the correlation such that the amount that the first and second individual scores contribute to the combined score is decreased more for a larger correlation; and ranking the documents on the basis of their combined scores.

13. The method of claim 12, and further comprising generating a document vector whose elements correspond to the documents and are weighted by the individual scores of the documents; and wherein performing a correlation operation comprises determining at least one correlation between at least one pair of document vectors; and wherein combining comprises combining the document vectors according to the combination regime to produce a combined document vector whose elements are combinations of the respective elements of the document vectors.

14. A method of operating a computerized information retrieval system where information is retrieved from a database containing documents in response to user queries, the method comprising:

receiving a query specifying information to be retrieved;

processing the query to abstract the query to each of a plurality of alternative representations suitable for input to a database of documents, each document of which is abstracted to each of the plurality of alternative representations;

for each alternative representation, matching that alternative representation of the query to each document's corresponding alternative representation to generate a score representing a measure of similarity, and generating a document vector whose elements correspond to the documents and are weighted by the scores of the documents;

combining the document vectors according to a combination regime to produce a combined document vector whose elements are combinations of the respective elements of the document vectors, referred to as combined scores, the combination regime being determined at least in part by determining at least one correlation between at least one pair of document vectors and reducing the weights of the pair of document vectors in the combination regime as a function of the correlation such that the weights are decreased more for a larger correlation; and ranking the documents on the basis of their combined scores.

15. A computer program product for operating a computerized information retrieval system where information is retrieved from a database containing documents in response to user queries, the product comprising:

code for receiving a query specifying information to be retrieved;

code for processing the query to abstract the query to each of a plurality of alternative representations suitable for input to a database of documents, each document of which is abstracted to each of the plurality of alternative representations;

code for determining, for each alternative representation, a set of documents, each of whose respective corresponding alternative representation bears a relationship to the alternative representation of the query representing a non-zero measure of similarity, the measure of similarity being referred to as an individual score;

code for combining the sets of documents, so determined, to define a combined set of documents, each document having a non-zero individual score for at least one of the plurality of alternative representations;

code for determining, for each query, a set of query specific parameters that depend on the query;

for at least some documents in the combined set, code for combining the individual scores according to a combination regime to produce a combined score, wherein the combination regime is a function of the plurality of individual scores and the set of query specific parameters; and a computer-readable storage medium that stores the codes.

16. The product of claim 15 wherein the set of query specific parameters depends on the length of the query.

17. The product of claim 15 wherein the set of query specific parameters depends on grammatical attributes of the query.

18. The product of claim 15 wherein the set of query specific parameters depends on terms contained in the query.

19. The product of claim 18 wherein the set of query specific parameters depends on synonyms for the terms contained in the query.

20. The product of claim 15 further comprising:

code for determining document specific information for at least some documents of the combined set of documents; and wherein the combination regime is a function of the document specific information.

21. The product of claim 20 wherein the document specific information depends on length of the documents.

22. The product of claim 15 further comprising:

code for determining correlation information between the individual scores of the documents within the combined set of documents, the correlation information indicating a measure of the degree to which the individual scores exhibit similar distributions; and wherein the combination regime is a function of the correlation information.

23. The product of claim 22 wherein the combination regime is determined such that contribution of one or more individual scores towards the combined score is decreased if the correlation information between the individual scores exhibits a high degree of similar distributions.

24. The product of claim 15 further comprising:

code for generating a ranked list of documents from the combined set of documents on basis of the combined scores of the documents;

code for displaying the ranked list of documents;

code for receiving user input specifying selection of at least some of the documents from the displayed list of documents, the selected documents indicating documents relevant to the user;

code for determining relevance feedback information based on the selected documents; and for at least some documents in the combined set, code for recombining the individual scores according to the combination regime to produce a second combined score, wherein the combination regime for producing the second combined score is a function of the plurality of individual scores, the set of query specific parameters, and the relevance feedback information.

25. The product of claim 15 wherein the combination regime is a function of a characteristic of at least some of the documents' individual scores.

26. A computerized information retrieval network system comprising:

at least one server data processing system coupled to a network, the server data processing system configured to retrieve information in response to a query;

a database of documents accessible to the server data processing system via the network;

at least one client system coupled to the server data processing system via the network, said client system configured to receive the query specifying information to be retrieved, and configured to communicate the query to the server data processing system via the network; and the server data processing system further comprising a query processor configured to abstract the query to each of a plurality of alternative representations suitable for input to the database of documents;

a document processor configured to abstract the documents in the database to each of the plurality of alternative representations;

a match score generator configured to determine a set of documents for each alternative representation, the alternative representation of each document bearing a relationship to the corresponding alternative representation of the query and indicating a non-zero measure of similarity, the measure of similarity being referred to as an individual score;

a score combiner configured to combine the sets of documents, so determined, to define a combined set of documents, each document in the combined set of documents having a non-zero individual score for at least one of the plurality of alternative representations;

the score combiner further configured to receive from the query processor, for each query, a set of query specific parameters that depend on the query; and the score combiner further configured to, for at least some documents in the combined set, combine the individual scores according to a combination regime to produce a combined score, wherein the combination regime is a function of the plurality of individual scores and the set of query specific parameters.

27. The computerized information retrieval network system of claim 26 wherein:

said score combiner is further configured to receive document specific information from the document processor for at least some documents of the combined set of documents; and wherein the combination regime is a function of the document specific information.

28. The computerized information retrieval network system of claim 26 wherein:

the server data processing system further comprises a score correlator, the score correlator configured to determine correlation information between the individual scores of the documents within the combined set of documents, the correlation information indicating a measure of the degree to which the individual scores exhibit similar distributions;

the score combiner is further configured to receive the correlation information from the score correlator for at least some documents of the combined set of documents; and wherein the combination regime is a function of the correlation information.

29. The computerized information retrieval network system of claim 28 wherein the combination regime is determined such that contribution of one or more individual scores towards the combined score is decreased if the correlation information between the individual scores exhibits a high degree of similar distributions.

30. The computerized information retrieval network system of claim 26 wherein:

the server data processing system is further configured to generate a ranked list of documents from the combined set of documents on basis of the combined scores of the documents, the server data processing system configured to communicate the ranked list of documents to the client system via the network;

the client system configured to display the ranked list of documents, the client system further configured to receive user input specifying selection of at least some of the documents from the displayed list of documents, the selected documents indicating documents relevant to the user, the client system configured to communicate the selected documents to the server data processing system; and the server data processing system configured to determine relevance feedback information based on the selected documents, and for at least some documents in the combined set, configured to recombine the individual scores according to the combination regime to produce a second combined score, wherein the combination regime is a function of the plurality of individual scores, the set of query specific parameters, and the relevance feedback information.

\* \* \* \* \*

UNITED STATES PATENT AND TRADEMARK OFFICE
CERTIFICATE OF CORRECTION

PATENT NO. : 6,269,368 B1
DATED : July 31, 2001
INVENTOR(S) : Theodore G. Diamond It is certified that error appears in the above-identified patent and that said Letters Patent is hereby corrected as shown below:

<u>Column 20,</u>
Line 57, replace "here" with -- where --.

Signed and Sealed this

Twentieth Day of April, 2004

JON W. DUDAS
*Acting Director of the United States Patent and Trademark Office*